United States Patent [19]

Sipek et al.

[11] 4,177,550

[45] Dec. 11, 1979

[54] MACHINE TOOL WITH HOLLOW STRUCTURAL STEEL MEMBERS

[75] Inventors: Charles B. Sipek, Hales Corners; Richard Johnstone, Brookfield; Russell B. Clegg, Milwaukee, all of Wis.

[73] Assignee: Kearney & Trecker Corporation, West Allis, Wis.

[21] Appl. No.: 874,327

[22] Filed: Feb. 1, 1978

[51] Int. Cl.² .................. B23B 37/00; B23C 1/00
[52] U.S. Cl. ................................. 29/568; 408/234; 248/678; 52/292; 82/32; 83/859; 409/183
[58] Field of Search .................... 29/568; 90/11 R; 408/234; 82/32; 83/859, 701; 52/292, 730, 731; 248/19, 23, 346; 51/166 R

[56] References Cited

U.S. PATENT DOCUMENTS

| | | | |
|---|---|---|---|
| 2,106,836 | 2/1938 | Forward | 82/32 |
| 2,789,480 | 4/1957 | Wellauer | 52/731 X |
| 2,824,499 | 2/1958 | Gambin et al. | 408/234 X |
| 3,199,386 | 8/1965 | Deflandre | 82/32 |
| 3,616,526 | 11/1971 | Tajima | 29/568 |

FOREIGN PATENT DOCUMENTS 856248 12/1960 United Kingdom ................ 82/32

Primary Examiner—Gil Weidenfeld
Attorney, Agent, or Firm—Cyril M. Hajewski; Donald E. Porter

[57] ABSTRACT

The bed and upright of a machine tool are made of structural steel tubes which are welded together to form unitary structures. Each of the structural steel tubes is substantially rectangular in cross-sectional shape.

6 Claims, 6 Drawing Figures

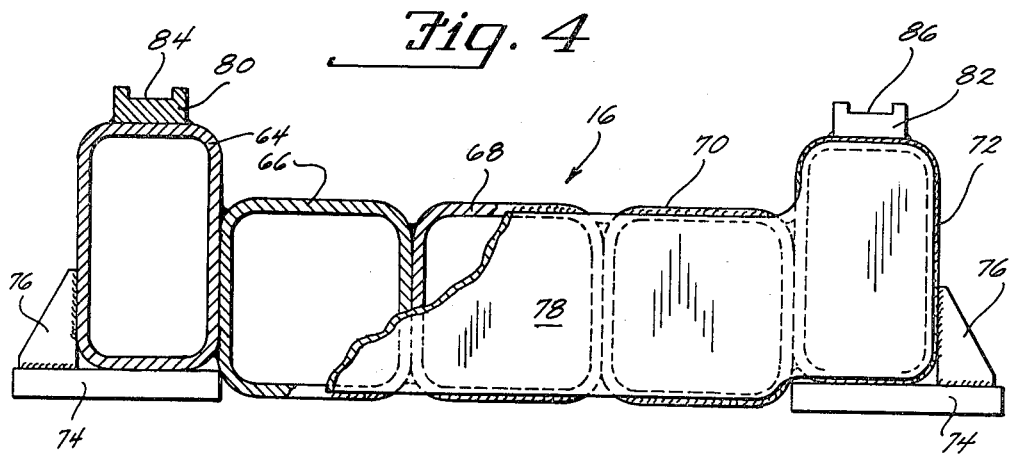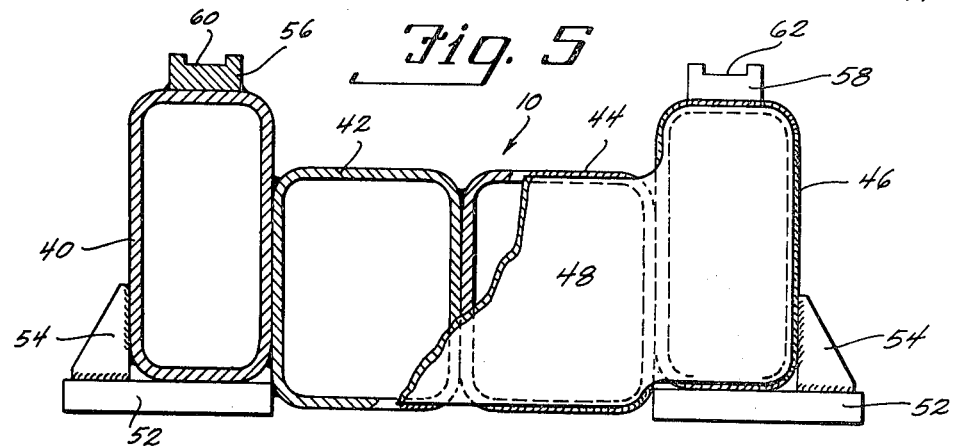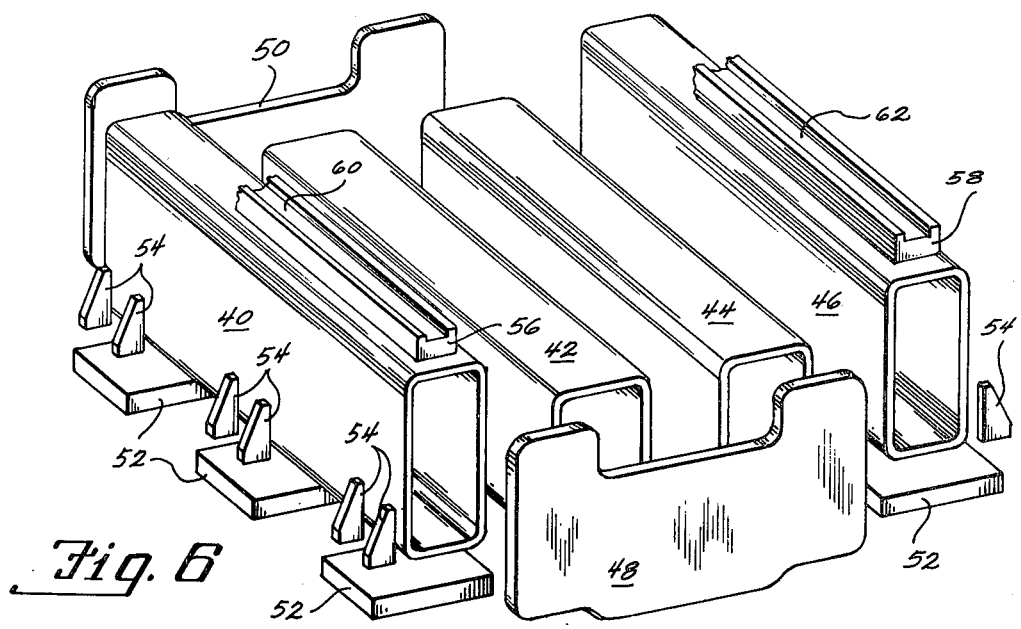

MACHINE TOOL WITH HOLLOW STRUCTURAL STEEL MEMBERS

BACKGROUND OF THE INVENTION

This invention relates to machine tool beds and uprights. In the past, machine tool beds and uprights were made of cast iron or steel, which are both heavy and expensive, or were made of welded flat frame members which, though light and inexpensive with respect to castings, were relatively weak. The principal object of this invention is to provide a machine tool bed and upright which are relatively light and inexpensive and are also relatively strong.

SUMMARY OF THE INVENTION

The bed of a machine tool is made of structural steel tubes which are connected together to form a unitary structure. A pair of ways is attached to the tubes to slidably receive an upright thereon.

DESCRIPTION OF THE DRAWINGS

FIG. 4 is a cross-sectional view taken on the line 4—4 of FIG. 2;

FIG. 5 is a cross-sectional view taken on the line 5—5 of FIG. 1; and

FIG. 6 is an exploded perspective view of the bed shown in FIGS. 1 and 5.

DESCRIPTION OF THE PREFERRED EMBODIMENTS

Figure 1:
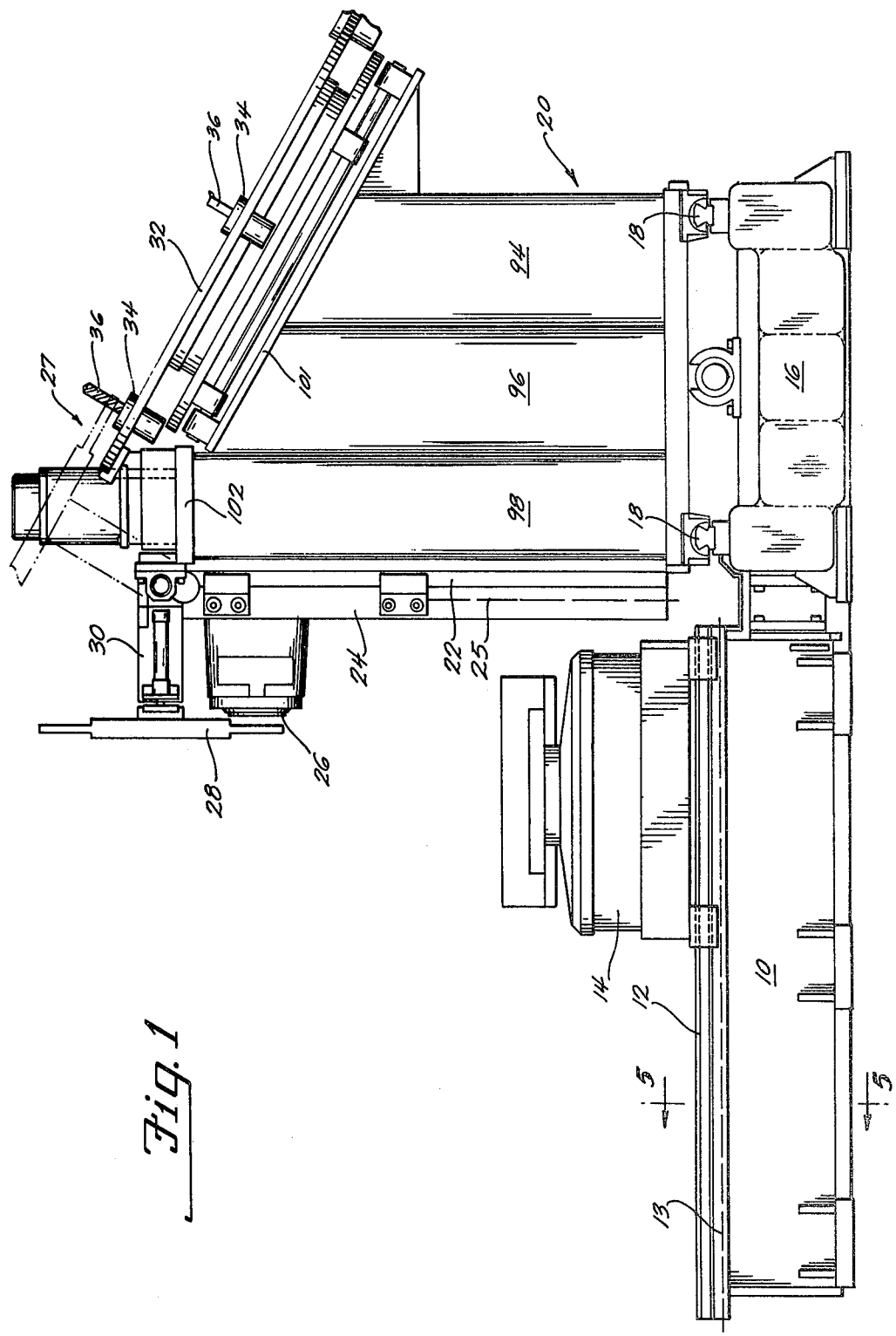
FIG. 1 is a side elevational view of a machine tool utilizing a preferred embodiment of the invention.
Figure 2:
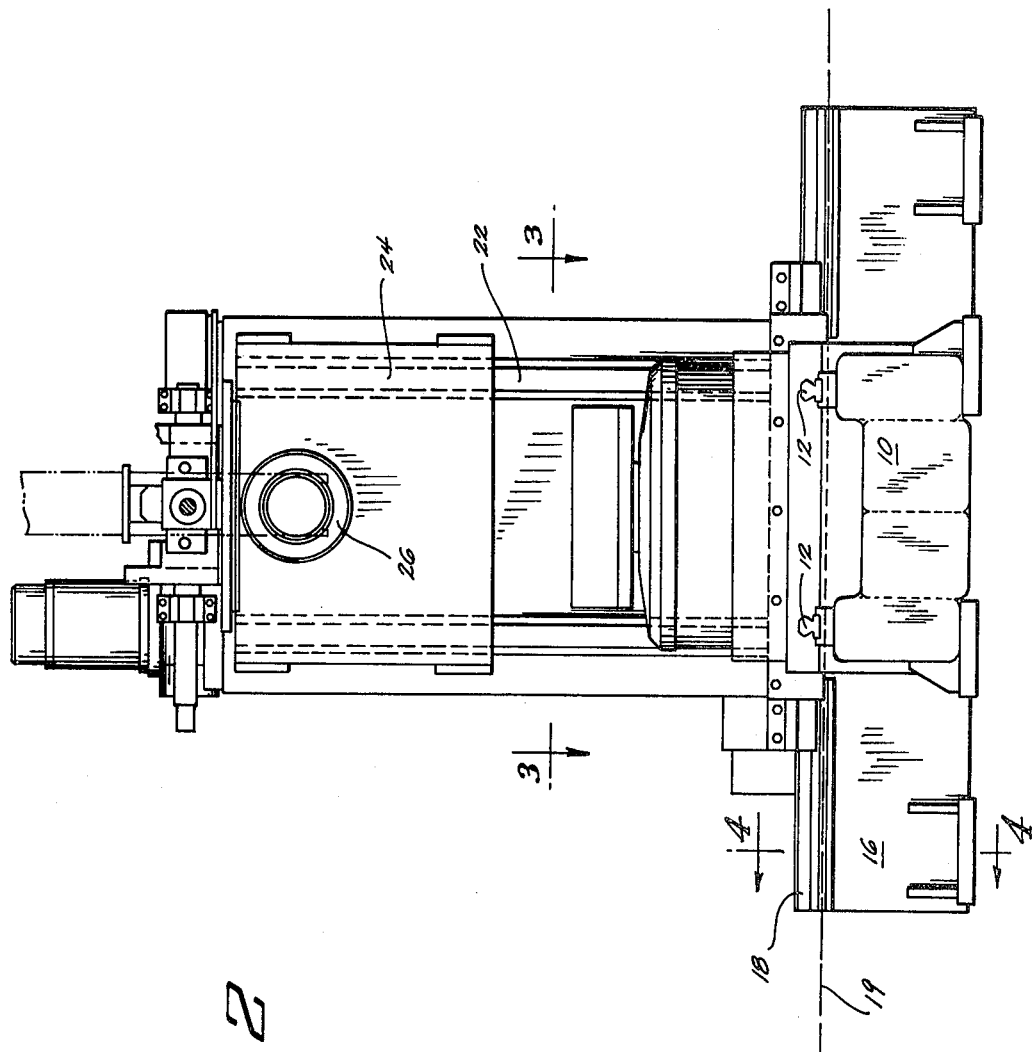
FIG. 2 is a front elevational view of the machine tool of FIG. 1.

Referring to FIGS. 1 and 2, one preferred embodiment of the invention is utilized in combination with a machine tool which includes a first bed 10, a first pair of horizontal ways 12 supported on bed 10, a worktable 14 slidably mounted on ways 12 for movement along a horizontal Z axis 13, a second bed 16, a second pair of horizontal ways 18 supported on bed 16, and an upright 20 slidably mounted on ways 18 for movement along a horizontal X axis 19 perpendicular to the Z axis. A pair of vertical ways 22 is supported on the front of upright 20 and slidably engages a spindlehead 24 which is movable along a vertical Y axis 25 perpendicular to both X axis 19 and Z axis 13. A spindle 26 is rotatably mounted on spindlehead 24 and is adapted to rotate a tool (not shown) to perform work on a workpiece (not shown) mounted on worktable 14.

This particular machine tool also has an automatic tool changer 27 which includes a tool changer arm 28, a tool changer carriage 30 and a tool changer drum 32. Automatic tool changer 27 acts to transfer toolholders 34 carrying tools 36 from tool changer drum 32 to spindle 26 and vice versa. However, it should be understood that automatic tool changer 27 is not an essential feature of the invention and that the machine tool could include a different type of automatic tool changer or no automatic tool changer.

FIGS. 3, 4, 5 and 6 show the detailed structure of beds 10 and 16 and upright 20. Referring to FIGS. 5 and 6, bed 10 includes four structural steel tubes 40, 42, 44 and 46 which are all substantially rectangular in cross-sectional shape. Structural steel tubes 40 to 46 are all the same length and are welded to two steel end plates 48 and 50 and to each other to form a unitary bed structure. (In FIG. 6, tubes 40 to 46 are shown exploded laterally and hence appear to be wider than end plates 48 and 50. However, end plates 48 and 50 extend the full width of tubes 40 to 46 as shown in FIG. 5). A plurality of flat steel foot plates 52 and braces 54 are welded to the bottom of the outer tubes 40 and 46 at spaced intervals to provide support for the structure. After the assembly is welded together, tapped holes (not shown) are formed in foot plates 52 to interact with conventional leveling screws (not shown) on the floor where the machine is to be installed.

A pair of flat steel strips 56 and 58 are welded to the top of tubes 40 and 46 to serve as a base for ways 12. Precision grooves 60 and 62 are milled in strips 56 and 58 after the bed is assembled to hold ways 12 in a precise position with respect to foot plates 52. The bed is preferably heat treated before machining to relieve stress due to unequal temperatures generated during the welding process.

The use of structural steel tubes for the basic building blocks of the bed has several advantages. In the first place, the tubes are both relatively light and relatively strong. In addition, they are readily available in a large variety of sizes and shapes since they are widely used as structural members in building construction and crane manufacturing. Also, the tubes are relatively inexpensive due to their relatively large scale use. Finally, when the tubes are laid parallel to each other, their rounded corners form a natural welding seam which eliminates the necessity for scarfing.

As can be seen in FIG. 5, the central tubes 42 and 44 are shorter in height than the exterior tubes 40 and 46. This is done to provide a recess in the bed to accommodate the ball screw mechanism and other portions of the machine tool that project beneath ways 12.

FIG. 4 is a cross-section taken on the line 4—4 of FIG. 2 and shows the construction of bed 16 which is similar to bed 10. The basic building blocks of bed 16 are rectangular structural steel tubes 64, 66, 68, 70 and 72. Foot plates 74 and braces 76 are welded to the bottom of the exterior tubes 64 and 72 and end plates 78 are welded to both ends of all of the tubes 64 to 72. Steel strips 80 and 82 are welded to the top of exterior tubes 64 and 72 to serve as bases for ways 18 and precision grooves 84 and 86 are milled in strips 80 and 82 to receive ways 18.

Figure 3:
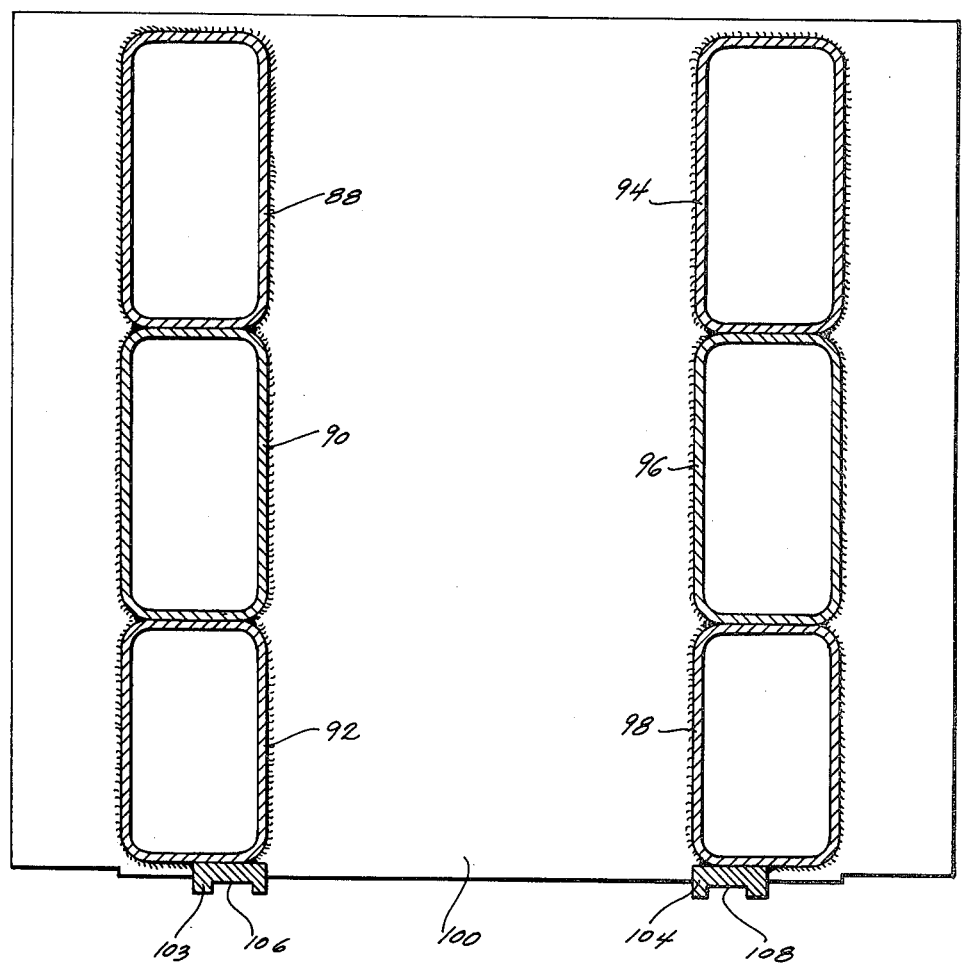
FIG. 3 is a cross-sectional view taken on the line 3—3 of FIG. 2.

FIG. 3 is a cross-sectional view taken on the line 3—3 of FIG. 2 showing the construction of upright 20. The basic building blocks of upright 20 are rectangular structural steel tubes 88, 90, 92, 94, 96 and 98 which are arranged in two parallel rows and are welded on their bottom to a base plate 100 and are welded together at adjacent edges to form two upstanding structural sides. A sloping top plate 101 (FIG. 1) is welded across the top of tubes 88, 90, 94 and 96 to serve as a base for supporting automatic tool changer 27. A flat top plate 102 (FIG. 1) is welded across the top of tubes 92 and 98 to serve as a base for supporting tool changer carriage 30. A pair of steel strips 103 and 104 (FIG. 3) are welded to the front of tubes 92 and 98 and have precision milled grooves 106 and 108 for receiving ways 22 which slidably support spindlehead 24.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, we hereby claim as our invention:

1. In a machine tool having a bed and having a member slidably mounted on said bed for movement along a horizontal axis, the improvement wherein said bed comprises a plurality of structural steel tubes;

all of said tubes being substantially rectangular in cross-sectional shape and extending in a parallel relationship, at least one flat longitudinal face of each of said tubes being in abutment and connected with an adjecent tube, means connecting the ends of all of said tubes together to form a unitary structure; and, a pair of ways attached to said tubes for slidably supporting said member.

2. The machine tool according to claim 1 wherein said member is an upright and comprises a plurality of structural steel tubes; and, means connecting said tubes together to form a unitary structure.

3. The machine tool according to claim 1 wherein said means connecting said ends of said tubes together includes a pair of end plates attached to opposite ends of said tubes.

4. The machine tool according to claim 3 and also including a plurality of foot plates attached to the bottom of the two exterior tubes in said bed.

5. The machine tool according to claim 2 wherein said tubes forming said upright are substantially rectangular in cross-sectional shape.

6. The machine tool according to claim 5 wherein the tubes forming said upright are arranged in two parallel rows; and, wherein said means connecting said tubes together include a top plate and a bottom attached to opposite ends of said tubes.

* * * * *